June 28, 1966  D. W. MILLS, SR  3,257,896
OPTICAL DRILL JIG COMPRISING A POLYGON
MIRROR AND AUTOCOLLIMATOR
Filed Feb. 25, 1963  2 Sheets-Sheet 2

INVENTOR.
DONALD W. MILLS SR.
BY

ATTORNEY

United States Patent Office 3,257,896
Patented June 28, 1966

3,257,896
OPTICAL DRILL JIG COMPRISING A POLYGON MIRROR AND AUTOCOLLIMATOR
Donald W. Mills, Sr., Akron, Ohio, assignor to Goodyear Aerospace Corporation, a corporation of Delaware
Filed Feb. 25, 1963, Ser. No. 260,638
3 Claims. (Cl. 88—14)

This invention relates to an optical drill jig for very accurately determining large equally spaced hole patterns.

Heretofore it has been known there are many and varied ways to construct patterns for large and equally spaced holes, but known procedures are not accurate to close tolerance, are very slow and time consuming, or are costly to accomplish. Large diameter hole patterns usually require a drill jig lay out from an initial starting position that can not eliminate slight errors from progressively multiplying from the initial starting position. Therefore, it has been the procedure to construct centerlines 90° apart and work the drill jig between these points to cut down on the tolerance build up. However, to accomplish this procedure the outside diameter of the part to be drilled is usually machined to close tolerance to facilitate register on the drilled jig, and often this is the only use of the close tolerance outside diameter. Besides, it is very expensive and time consuming to use a drill jig to accomplish the hole pattern in the manner.

It is the general object of the invention to avoid and overcome the foregoing and other difficulties of and objections to prior art practices by the provision of an auto collimator projecting its index mark into a polygon mirror which has been adapted to a bar with its center point being the center of the required drill pattern, and with this center point being the reference point for all the holes of the pattern thereby referencing all the holes to the established center position and eliminating the tolerance build up or slight errors inherent in the present system.

Another object of the invention is to provide an optical drill jig characterized by the use of a polygon mirror of any desired number of sides with a marker bar of any desired length to thereby achieve an equally spaced hole pattern for any number of holes at any desired radius.

Another object of the invention is to provide an optical drill jig wherein the same polygon mirror and marker bar or an exact duplicate of each can be used on separate apparatus and still achieve a hole pattern that is accurate to within two-thousandths of an inch.

Another object of the invention is to provide an optical drill jig wherein neither the outer nor the inner diameter of the apparatus receiving the equally spaced hole pattern need to be machined to close tolerance in order for the hole pattern to be accurately and equally spaced.

Another object of the invention is the provision of relatively inexpensive, light weight, and easily operated apparatus for accurately and quickly locating points on a large circular or ring-shaped work-piece.

The aforesaid objects of the invention, and other objects which will become apparent as the description proceeds, are achieved by providing an optical drill jig using an auto collimator projecting its cross hairs into a polygon mirror which has been adapted to a bar with its center point being the center of the required drill pattern, the radius being established by a single hole tied into the center of rotation or pivot point of the bar, and which bar can be rotationally pivoted in the desired plane without changing the center of rotation or the pivot point of the bar.

For a better understanding of the invention reference should be had to the accompanying drawings, wherein.

Figure 2:
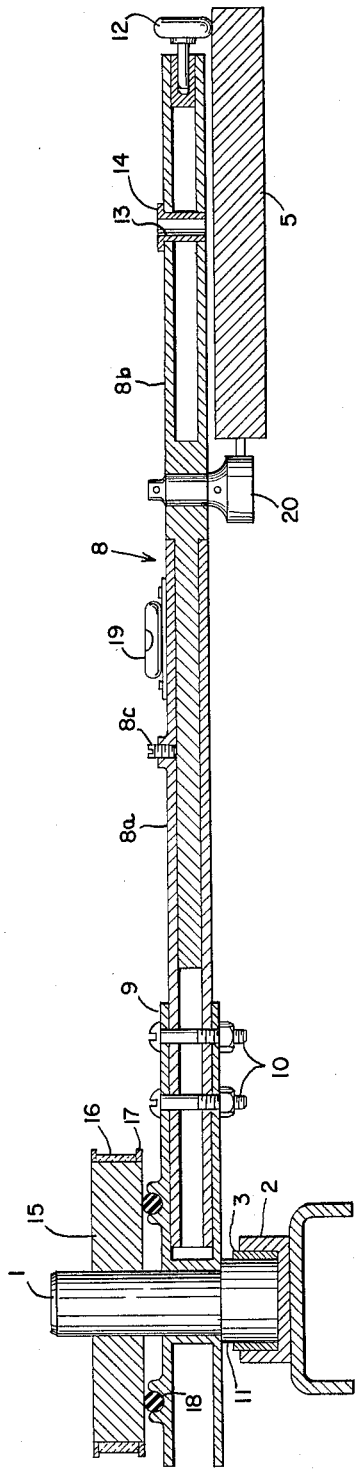
FIGURE 2 is an enlarged vertical cross sectional view of the drill bar of the invention taken on the line 2—2 of FIGURE 1.

With specific reference to the form of the invention illustrated in the drawings, the numeral 1 indicates generally a cylindrically shaped center post which is removably and rotatably secured to a base 2 through a self-alining bearing 3, as best seen in FIGURE 2. The base 2 is normally secured to a C-shaped mounting channel 4 by welding as shown in FIGURE 2, or some other suitable means.

Figure 1:
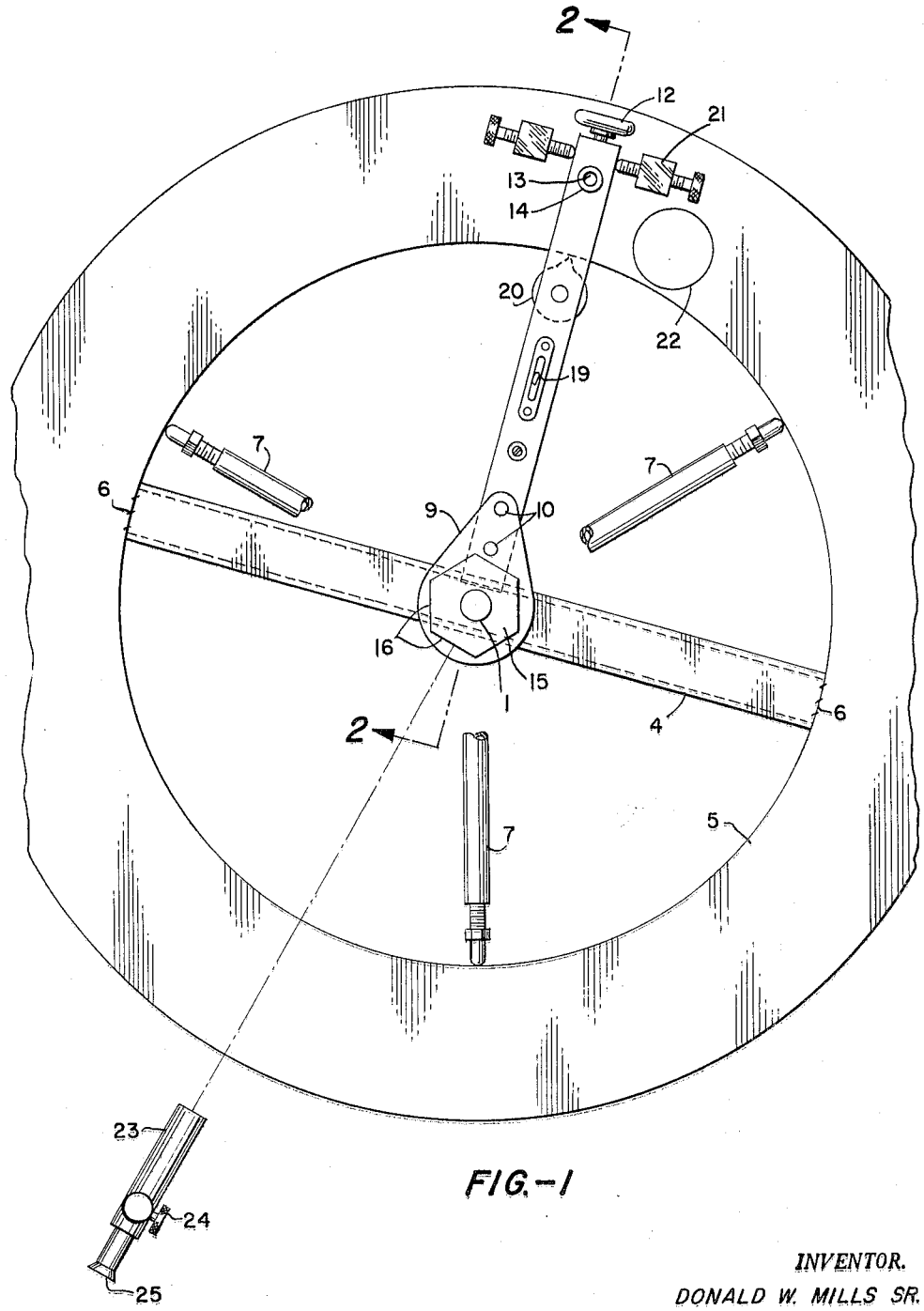
FIGURE 1 is a top plan view of one embodiment of the invention.

As shown in FIGURE 1, the mounting channel 4 extends across the diameter of the hole through the work piece or part 5 which is to receive the hole pattern. Normally, the mounting channel 4 is tack welded at 6 where it contacts the hole receiving part 5 to thereby hold the channel 4 in proper position. However, before tack welding the mounting channel 4 in position, it is normally placed in the proper position by means of an adjustable triangular telescoping means 7 which engages with and centers the post 1 in relation to the inside or outside diameter of the part 5 as accurately as possible, or as accurately as the machined surface allows.

There are other and varied methods of centering the post 1 which could be employed when an accurate inside or outside diameter is not available, or the part 5 is continuous with no hole through its center. Thus, although it is important that the post 1 be positioned as closely as possible to the center of the part 5, it is not an absolute necessity because the hole pattern is not dependent on the post 1 being in exact center of the part 5, but rather the hole pattern is dependent only upon being centered on the post.

A drill bar generally denoted by the numeral 8, normally made of two square sections 8a and 8b, has section 8a mounted in an adapter 9 by a plurality of bolts 10. The adapter is removably fitted over the post 1 and rides pivotally or rotatably as the pin 1 rotates. It is noted that the bottom flange of the adapter 9 rests on the rotating shoulder 11 of the self-aligning bearing 3 which supports the mounting post 1. The drill bar is preferably of the same material as the work-piece or part 5 so that any differentials of expansion upon temperature changes are largely eliminated. The end of section 8b of the drill bar 8 contains a rotatable wheel 12 movable on the part 5 and mounted perpendicular to the longitudinal axis of the drill bar 8. Therefore, when the drill bar is pivoted with the post 1 the wheel 12 rolls on part 5 allowing the bar to move freely and easily with no strain to a new radial position. A marking hole 13 with a hard metallic sleeve 14 is provided through section 8b for marking the hole position on the part 5. In order to permit adjustment of the length of the drill bar 8 the section 8b thereof slidably extends into the hollow section 8a. These sections are then adjusted to provide the proper radius holes and then held in the proper position as by set screw 8c.

A polygon mirror, indicated as a whole by the numeral 15 removably fits on the post 1 on top of the adapter 9 of the drill bar 8. The polygon mirror 15 contains small glass mirrors 16 usually adhesively secured to a metallic frame 17. Usually, the polygon mirror, fit with close tolerance on the pin 1, rests on an endless rubber holding ring 18 mounted on top of the adapter 8. However, the polygon mirror may be held in position by means of a screw (not shown) fitting on top of the post 1 and holding the mirror in position.

Although a straight center post 1 as shown in FIGURE 2 has been described for the mounting the remainder of the apparatus of the invention, a lapped cone arrangement could be used and might be preferable in certain cases.

A level bubble 19 is removably fitted in the drill bar 8 to insure that the bar is level when marking each hole through the hole marker 13. Also, a dial indicator 20 is removably mounted on the drill bar 8 to insure that the post 1 has not moved as the drill bar 8 is pivoted to mark successive holes on the part 5. The dial indicator 20 can be used only when the inner diameter of the part has been machined to a true center and the post 1 has been accurately positioned on that true center. A pair of coarse-fine adjusting screws 21 are mounted, usually magnetically, on the part 5 and engage with opposite sides of the bar 8 to initially and finally adjust the radial position of the drill bar 8. A drill stand 22 is provided wherein a suitable drill is mounted for positioning a drill through the marker hole 13 and bushing 14 to accurately drill the hole on the part 5.

An autocollimator 23 such as that made by Keuffel & Esser Co. CN9092-2 with a telescopic adjustment 24 and eye piece 25 is provided to look at and register with selected faces of the polygon mirror 15. The collimator 23 can be mounted on a tripod resting on the floor or other separate means from the part 5, or can be attached to the part 5 as circumstances demand. The greatest accuracy is acquired by not moving the autocollimator or the part 5 during the positioning and drilling operations.

In actual operation with the post 1 positioned in the center of the part 5 as previously described, the operator sights through the autocollimator 23 into one of the mirrors 16 of the polygon mirror 15. Cross hairs are projected on the mirror 16 from the autocollimator 23 and the mirror 16 is moved by rotating the polygon mirror and the drill bar 8 about the axis of post 1, to a position where the cross hairs are reflected back from the mirror 16 to align with the cross hairs in the telescope of the autocollimator 23 to insure that a perfect right angle is thereby achieved from the line of sight through the auto collimator and the plane of the mirror 16. To achieve this alignment the bar 8 is brought to rough alignment and then the adjusting screws 21 positioned on the part 5 to each side of the bar 8 are adjusted to pivot the drill bar 8 to autocollimation heretofore described. As an alternative to projecting cross hairs on the mirror a single perpendicular index line may be projected on the mirror and the reflection aligned with a perpendicular line in the telescope.

When auto collimation has been achieved a drill mounted on the drill platform 22 is then directed through the marker hole 12 and bushing 13 and a hole is drilled into the part 5. Normally, the marker hole is ⅛ to ¼ inch in diameter as this provides the most accurate marking drill means, and is of a size to allow a dowel or marker pin to be inserted therein. When the marker hole has been drilled, the drill bar 8 is pivoted arcuately until the next mirror 16 of the polygon mirror 15 is approximately at right angles to the autocollimator 23. Then the same procedure is followed to match the index mark of that mirror with the index mark of the auto collimator, and the hole is similarly marked or drilled. With the dowel or marker pins in position as described on the part 5, it is a simple matter to index the part 5 with a radial drill or boring machine to make larger accurately positioned holes in the part 5.

Thus, by using a polygon mirror 15 of any desired number of sides, or by employing only selected sides, a hole pattern of any number of holes can thereby be achieved. Also, each hole is dependent on the center post 1 and the accuracy of the polygon mirror 15, which means there can be no compounding or building up of errors. The apparatus of the invention for spacing equally distant large hole patterns has given an accuracy within two-thousandths of an inch, and has proved to be very reliable, easy to operate, and quite inexpensive.

It will be recognized that the objects of the invention have been achieved by providing a polygon mirror mounted on a rotatable center post, which post also carries a drill bar, and which drill bar has a marker hole. An autocollimator is fixedly mounted in the same horizontal plane as the polygon mirror and the drill bar is pivoted to align the plane of any individual mirror at an exact perpendicular to the line of sight of the autocollimator, to thereby accurately position the holes of the pattern desired.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In an optical drill jig for determining large equally spaced hole patterns in a work piece the provision of a support and centering means comprising a C-shaped mounting channel secured to the work piece, a center post base secured to the mounting channel, a cylindrically shaped center post mounted in a self-aligning bearing rotatably and removably secured to the center post base, a hollow tube-like drill bar, a flat oblong-shaped adapter fitted at one end to said drill bar, said adapter removably fitting on the center post to thereby make the drill bar pivotal in the plane of the adapter, said plane of the adapter being perpendicular to the longitudinal axis of the center post and substantially parallel to the surface of the work piece, a rotatable wheel mounted on the longitudinal axis of the bar at the end opposite the adapter, said bar extending over the work piece and having at least one marking hole over the work piece somewhat nearer the wheel end than the adapter end of the bar, the hole being perpendicular to the plane of the adapter, a level indicator means on the bar, a dial indicator on the bar to determine if the position of the center post is constant, a polygon mirror removably fitting on the center post with the longitudinal axis of the polygon mirror coinciding with the longitudinal axis of the center post, said polygon mirror containing a number of mirrors equal to the sides of the polygon with each individual mirror being parallel to the longitudinal axis of the polygon and its respective side of the polygon, an autocollimator separately mounted in a plane right angularly perpendicular to the longitudinal axis of the polygon and spaced midway between the upper and the lower surfaces of said polygon, said autocollimator adapted to project at least one index line on one of the individual mirrors and having an index line parallel to the index line projected on said mirrors, means to minutely adjust the radial position of the drill bar, bushing means to position a drill bit in the marking hole, and means to drill a marking hole into the work piece.

2. The combination recited in claim 1 wherein a three-legged center spider is provided, means for adjusting each leg of the spider, and means at the center of the spider for engaging the center post.

3. An optical drill jig for determining equally spaced hole patterns of at least three holes in a work piece including, base means adjustably mounted on the work piece, centering means for placing said base means in the center of the required drill pattern, mounting pin means rotatably journalled in said base means, drill bar means secured to said mounting pin means and extending radially therefrom over the work piece, said drill bar having a marker hole therethrough, said hole being placed on the bar at a distance from the mounting pin means equal to the desired radius for the hole pattern, a polygon mirror having sides of equal length, and equal angles between sides removably secured to said mounting pin means for rotation therewith, said polygon mirror having a number of mirrors equal to the sides of the polygon and equal to the number of holes in the hole pattern, an autocollimator mounted in the plane of the polygon mirror, said autocollimator consecutively aligning with each mirror on the polygon mirror as said mirror and drill bar means are rotated about the axis of the mounting pin means wherein the position of each hole in the hole pattern can be marked on the work piece through said marker hole, a single vertically directed index line in the autocollimator, means to minutely adjust the radial position of the drill bar to align the index line of the autocollimator projected on each mirror of the polygon mirror with the index lines in the autocollimator, means to adjustably extend or shorten the length of the drill bar, level indicator means mounted on said drill bar dial indicator mounted on said drill bar, means to determine if the position of said base means has remained constant, and means mounted on the bar engaging with the work piece and facilitating the rotation of the drill bar thereon.

References Cited by the Examiner

UNITED STATES PATENTS

| | | | |
|---|---|---|---|
| 1,403,156 | 1/1922 | Gonzalez | 33—174 |
| 2,373,918 | 4/1945 | Schoeniger | 77—62 |
| 3,044,173 | 7/1962 | O'Neal et al. | |
| 3,052,974 | 9/1962 | Williams | 88—14 |
| 3,069,933 | 12/1962 | McCall | 77—62 |
| 3,117,178 | 1/1964 | Webber | 88—14 |
| 3,187,736 | 6/1965 | Adamczyk. | |

OTHER REFERENCES

"Job Twenty Times More Accurate Than the Machine," Metalworking Production, McGraw-Hill, London, vol. 105, No. 10, pp. 59–61.

JEWELL H. PEDERSEN, *Primary Examiner.*

O. B. CHEW, *Assistant Examiner.*